United States Patent [19]
Wilkerson et al.

[11] Patent Number: 5,872,621
[45] Date of Patent: Feb. 16, 1999

[54] HOLOGRAPHIC TRANSMISSION BEAM DIRECTOR

[75] Inventors: Thomas D. Wilkerson, Hyde Park, Utah; Jack A. McKay, Washington, D.C.

[73] Assignee: Utah State University, N. Logan, Utah

[21] Appl. No.: 718,149

[22] Filed: Sep. 18, 1996

Related U.S. Application Data

[60] Provisional application No. 60/003,919, Sep. 18, 1995 and provisional application No. 60/003,926, Sep. 18, 1995.
[51] Int. Cl.$^6$ ........................................................ G01P 3/36
[52] U.S. Cl. .............................................................. 356/28.5
[58] Field of Search .................................. 356/3.08, 28.5, 356/39, 238, 239, 5.15, 28, 337, 339, 241, 343, 345; 73/655; 359/168; 367/130; 250/574

[56] References Cited

U.S. PATENT DOCUMENTS 5,255,065  10/1993  Schwemmer .

*Primary Examiner*—William Oen
*Attorney, Agent, or Firm*—Thorpe, North & Western, LLP

[57] ABSTRACT

The present invention applies to the art of wind sensing using lidar, and in particular to the art of detecting the speed of objects such as air-borne particles and molecules in the atmosphere in order to determine the speed and direction of the wind which is carrying them. The present invention is a beam director for directing a beam transmitted from a lidar at objects to produce backscattered light and for directing the backscattered light into a lidar receiver. The preferred embodiment of the director comprises a rotatable holographic optical element for directing the transmitted beam in various directions, and then through the same rotatable holographic optical element direct backscattered light from various directions into a receiver. In one alternative embodiment of the director, a prism is disposed in the director for directing the transmitted beam. The lidar having the beam director is moved in a vehicle such as a satellite, so that wind characteristics such as wind speed and direction at a number of altitudes and over a large area can be measured.

12 Claims, 9 Drawing Sheets

HOLOGRAPHIC TRANSMISSION BEAM DIRECTOR

BACKGROUND OF THE INVENTION

This application claims the benefit of U.S. Provisional Application No. 60/003,919, filed Sep. 18, 1995, entitled LIDAR ATMOSPHERIC WIND DETECTOR, and of U.S. Provisional Application No. 60/003,926, filed Sep. 18, 1995, entitled HOLOGRAPHIC OPTICAL ELEMENT BEAM DIRECTOR FOR LIDAR.

1. The Field of the Invention

The present invention pertains to beam directors in the field of wind sensing using lidar, and particularly the use of lidar in detecting the speed and direction of objects such as air-born particles and molecules in the atmosphere in order to determine the speed and direction of the wind which is carrying them.

2. The Background Art

The advance of new and innovative applications for lasers has pushed forward the development of technologies which support those applications. Atmospheric research using laser technologies in particular has been a growing field among the ever increasing applications of laser light. For purposes of convenience, the term "light" will be used to mean electromagnetic radiation of all frequencies and wavelengths. It has been found that laser light can be used to make both precise and accurate measurements, which is particularly useful in determining atmospheric wind characteristics such as wind speed and direction. Wind speed and direction are important to a number of disciplines, including the scientific fields such as meteorology and atmospheric research as well as applied fields such as military and commercial travel. These disciplines, and others, have demonstrated an ever increasing need for accurate, precise and cost effective information regarding wind; however, such acquisition of information has presented a number of challenges. To this end, a lidar wind detector has been developed.

As the idea of using lidar to determine wind characteristics has emerged, with it there has been a need for simple, effective and sensitive transmitters for transmitting a beam of light at an object to create backscattered light, and receivers for detecting the backscattered light. Lasers, which are the light sources for lidar, transmit beams which strike moving objects in the atmosphere (such as air-borne particles and molecules), wherein the backscattered light has undergone Doppler shifts due to the movement of the objects which can be used to determine the speed and direction of the object, and hence speed and direction of the wind. This backscattered, Doppler shifted, light is then gathered and directed into a receiver wherein it can be analyzed to determine the Doppler shift. There has been a recognized need for improved technology in gathering and directing the backscattered light.

It is advantageous for the lidar laser beam to sweep or scan along a path at an angle to the receiver; however, it has proven difficult not only to transmit, but to gather and direct the backscattered light into a receiving light sensitive element. A number of different approaches have been attempted, primarily using mirrors to vary the direction of the outgoing and incoming backscattered light. Generally, the mirrors are rotated and adjusted to direct the transmitted light beam so that it is backscattered by an object and to direct the backscattered light into the receiver; however, this approach has limitations.

One significant limitation to the use of mirrors arises from their size and mass. High resolution mirrors are required for lidar to provide accurate measurements, particularly where small objects are measured at great distances, as in the present invention. Generally, the resolution of a mirror improves as mirror size increases and high resolution mirrors are rather large. There are also problems in the manufacturing and deployment of large mirrors, particularly where the mirrors are used in satellites. First, there are material limitations, as large glass mirrors may crack or shatter, and large mirrors are awkward and cumbersome to handle. In addition there are production difficulties in producing mirrors within allowable tolerances of curvature and reflection. Finally, high resolution mirrors are further limited by their mass in deployment, as they add to the payload of the deployment vehicle.

Additional challenges are created with satellite deployment of large mirrors. The substantial mass of a high resolution mirror means the mirror has a large moment of inertia and large angular momentum when it is moving or turning. Further limitations arise from the motors and mechanical components required for operation of the mirrors because they must be of sufficient size to handle the inertia of the mirrors but must be very smooth and vibration free in operation as vibrations will adversely effect the resolution of the mirrors. Thus, not only are there technical challenges in producing movable mirrors with minimal mechanical vibration, Newtonian mechanics requires that the satellite include systems such as momentum wheels or gyroscopic stabilizers to compensate for the inertia of the mirrors and maintain satellite stability, otherwise the satellite may tumble. For this reason mirrors require significant amounts of fuel and energy to compensate for necessary mirror movement. Additionally, it is difficult to adjust, replace or repair a large mirror after satellite deployment should defects be discovered or develop. As can be seen, there are substantial costs and economic burdens associated with use of movable mirrors on satellites.

It would therefore be an advantage to have an apparatus or method of gathering backscatter and directing it into a receiver, which requires minimal mechanical elements, is small, easily and cost effectively manufactured, with a minimal mass, moment of inertia and angular momentum, while having substantially high optical clarity and resolution quality. It would also be an advantage if the device or method used components which are relatively easy and inexpensive to maintain, requiring little or no repair. It would be a further advantage to measure wind speed and direction at numerous and various points around earth using a movable vehicle such as a satellite. It would be an additional advantage to make measurements of wind characteristics in an efficient and cost effective manner.

OBJECTS AND SUMMARY OF THE INVENTION

It is therefore an object of the present invention to provide a beam director for gathering backscattered light and directing it into the receiver.

It is another object of the present invention to provide such a beam director which comprises at least one holographic optical element.

It is another object of the present invention to provide such a beam director which can gather and direct backscattered light coming from a number of different directions.

It is another object of the present invention to provide such a beam director which can be used on a satellite.

It is another object of the present invention to provide a beam director which can be used in conjunction with lidar.

It is another object of the present invention to provide a beam director having minimal mass, moment of inertia and angular momentum.

It is another object of the present invention to provide a beam director that requires minimal fuel to operate.

It is another object of the present invention to provide a beam director having high optical clarity and resolution quality.

It is another object of the present invention to provide a beam director having minimal mechanical elements.

It is another object of the present invention to provide a beam director that is small.

It is another object of the present invention to provide a beam director which can be easily and cost effectively manufactured.

It will be obvious to those skilled in the art that the disclosed invention is applicable to all frequencies of light and light beam directors.

The present invention applies to the art of wind sensing using lidar, and in particular to the art of detecting the speed of objects such as air-borne particles and molecules in the atmosphere in order to determine the speed and direction of the wind which is carrying them. The present invention is a beam director for directing a beam transmitted from a lidar at objects to produce backscattered light and for directing the backscattered light into a lidar receiver. The preferred embodiment of the director comprises a rotatable holographic optical element for directing the transmitted beam in various directions, and then through the same rotatable holographic optical element direct backscattered light from various directions into a receiver. In one alternative embodiment of the director, a prism is disposed in the director for directing the transmitted beam. The lidar having the beam director is moved in a vehicle such as a satellite, so that wind characteristics such as wind speed and direction at a number of altitudes and over a large area can be measured.

It will be obvious to those skilled in the art that the disclosed invention is applicable to gather information regarding the flow or dynamics of fluids or gasses, including information about speed, velocity, direction and momentum.

The present invention also includes a lidar for detecting characteristics of the atmosphere, and in particular for detecting the speed and direction of objects such as air-borne particles and molecules in the atmosphere in order to determine the speed and direction of wind which is carrying them. The lidar comprises at least one lasing transmitter which transmits at least one lasing beam of radiation in the frequency range of ultraviolet light and which is swept along a path in the atmosphere so as to strike objects in the atmosphere causing backscatter radiation which is received by a receiver for determination of the Doppler shift of the objects being struck. The lidar is moved in a vehicle such as a satellite, so that wind speeds and directions at a number of altitudes and over a large area can be measured.

These and other objects, features, advantages and alternative aspects of the present invention will become apparent to those skilled in the art from a consideration of the following detailed description taken in combination with the accompanying drawings.

The preferred embodiment of the present invention, as will be discussed henceforth, is a satellite-based application of lidar technology. While most elements of the present invention are known to those skilled in the respective arts, the present invention takes advantage of particular properties of lasers which are particularly prevalent in a laser known as an Alexandrite ring laser. Specifically, the advantageous ability of an Alexandrite ring laser to be tuned to transmit a beam having a desired frequency with a high degree of precision is combined with a holographic optical element (HOE) which causes the laser beam to sweep over the desired area of interest. The HOE enables the satellite-based lidar to conserve precious fuel and energy because of the relatively small amount of inertia created by the HOE for which the satellite must compensate. This is in stark contrast to the mirror-based scanning devices of the prior art which create significant amounts of inertia. Furthermore, by using the Alexandrite ring laser, the precision of the lidar is significantly improved because of the narrow band width and large frequency range over which the laser can be tuned to operate.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION

Figure 1:
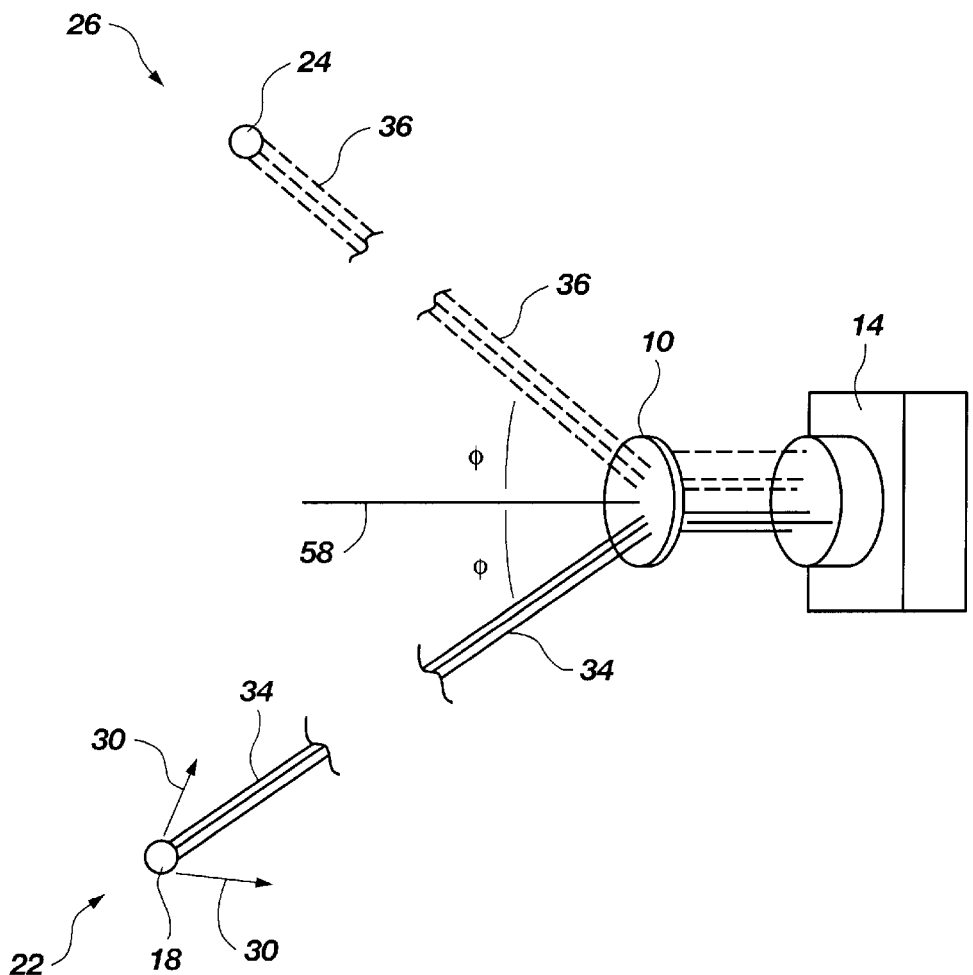
FIG. 1 is a schematic diagram of the application of a beam director, made in accordance with the principles of the present invention and showing the beam director directing backscattered electromagnetic radiation into a lidar receiver.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the relevant art and possessed of this disclosure, are to be considered within the scope of the invention claimed.

The preferred embodiment of the present invention, as will be discussed henceforth, is a satellite-based application of lidar technology. While most elements of the present invention are known to those skilled in the respective arts, the present invention takes advantage of particular properties of at least one holographic optical element (HOE) to: (1) direct at least one transmitted beam of radiation at objects in order to create backscattered light and (2) to direct backscattered light into a receiver where it is detected. Specifically, it is advantageous that the HOE can be rotated so that the beam can sweep over the desired area of interest; it is also advantageous that the HOE can be rotated so that backscatter can be selectively directed from different directions into the receiver. The HOE enables the satellite-based lidar to conserve precious fuel and energy because of the relatively small amount of inertia created by the HOE for which the satellite must compensate.

Referring to FIG. 1, there is shown a beam director 10 in conjunction with a receiver 14 for a lidar, not shown, and a first object 18. The first object 18 is shown in a first position generally designated as 22 and a second object 24 is shown in a second position generally designated as 26 relative to the position receiver 14 and director 10. Fundamental to the operation of the lidar is that a beam of laser light transmitted from the lidar (the transmitted beam 28, shown in FIGS. 5–6) strikes an object 18, 24 and is scattered. Light scattered from the first object 18 in random directions is shown as scattered light 30, which is shown in FIG. 1 by arrows. Light which has been scattered by the first object 18 at an angle of 180° to the incidence of the transmitted beam is shown as the backscattered light 34, shown as three parallel lines. Similarly, three ghost-lines represent the backscattered light 36 from second object 24. Two positions 22, 26 are indicated to show the change in the direction of the backscattered light 34, 38 over time. It is the backscattered light 34, 36, and directing the backscattered light 34, 36 into the receiver 14, which is the concern of the present invention.

Figure 2:
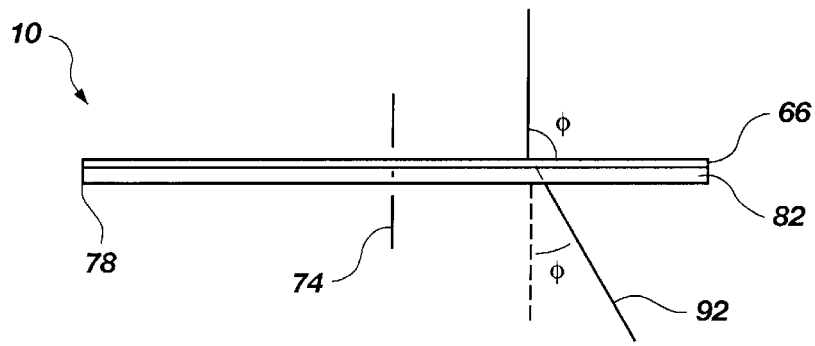
FIG. 2 is a side view of the beam director of FIG. 1, indicating the path of backscattered light.

There is considerable distance between the objects 18, 24 and the beam director 10, therefore breaks have been included in representing the backscattered light 34 and 36 to show distance. As shown in FIG. 2, an application of the preferred embodiment of the present invention is use in a satellite 38, albeit any form of ground or above ground vehicle may be used.

Figure 5:
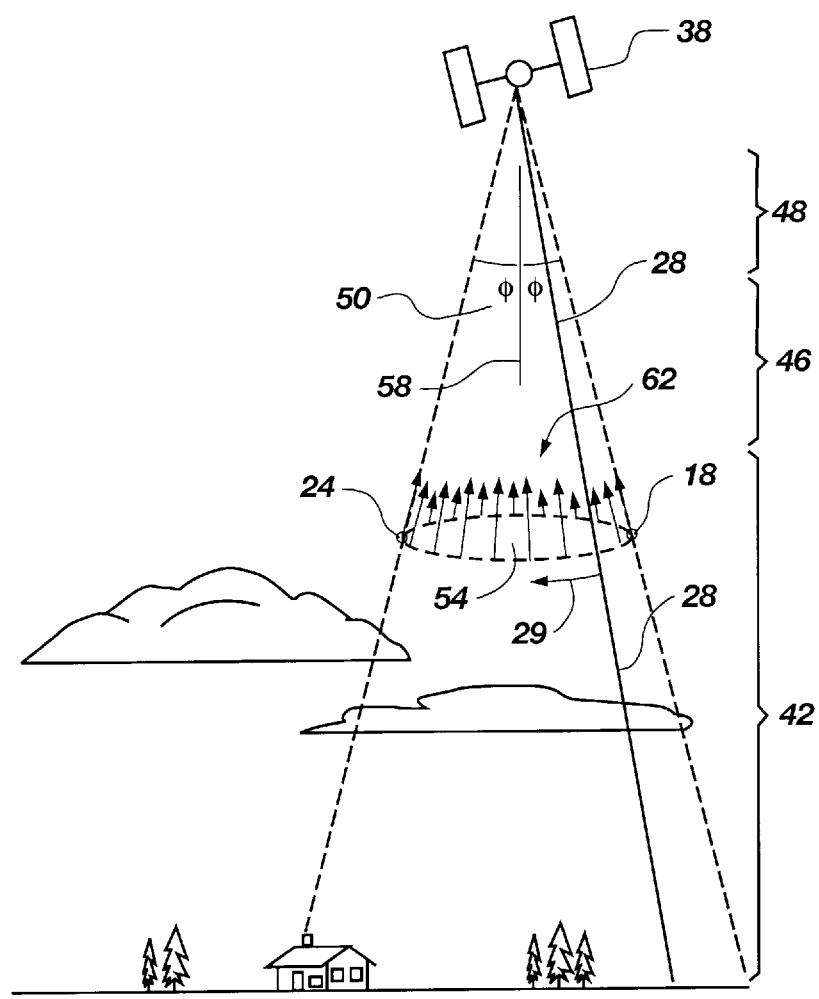
FIG. 5 is a representation of a scanning transmitted beam from a satellite producing backscattered light of FIG. 2–3.

It will be noted that FIG. 5 indicates the location of the troposphere 42, the stratosphere 46 and the mesosphere 48. In the practice of the preferred embodiment of the invention the first and second objects 18, 24 are located in the troposphere 42, shown in FIG. 5, and the satellite 38 is located in the mesosphere 48. The transmitted beam 28 of the lidar sweeps a path defining a conical region 50 at a scanning angle φ to a conical axis 58, having a circular or elliptical footprint 54 relative to the satellite 38. A clockwise direction of the sweep is indicated by the sweep direction arrow 29, but it may either be clockwise or counterclockwise. As the transmitted beam strikes objects it is scattered; some of it is scattered at an angle of 180° to the transmitted beam which is the backscattered light generally depicted by the arrows at 62 in FIG. 5.

Referring now to FIG. 1, the backscattered light 34, 36, travelling to the beam director 10 at an angle, in the preferred embodiment the angle being the same as the scanning angle φ of the transmitted beam to the conical axis 58, passes through the beam director 10 and is directed into the receiver 14. In the present invention the beam director 10 comprises a holographic optical element (HOE) 66, shown in FIG. 2. HOE 66, including holograms, are available which have high optical clarity and resolution quality.

In the preferred embodiment, the HOE 66 is a planar, thin sheet of material capable of receiving a holographic image. The HOE 66 is circular in shape, shown in FIG. 4, having a radius 70 of approximately eight (8) inches, although HOE having a wide range of radii and a variety of shapes may be utilized. The radius 70 is defined from the center axis 74 of the HOE 66 to edge 78. In the preferred embodiment the HOE 66 is sufficiently thin as to require a translucent plate 82 to support it, shown in FIGS. 2–3; the HOE have additional physical characteristics which include: the translucent plate 82 permits unimpeded passage of light and the HOE 66 and the translucent plate 82 have minimal masses.

Figure 3:
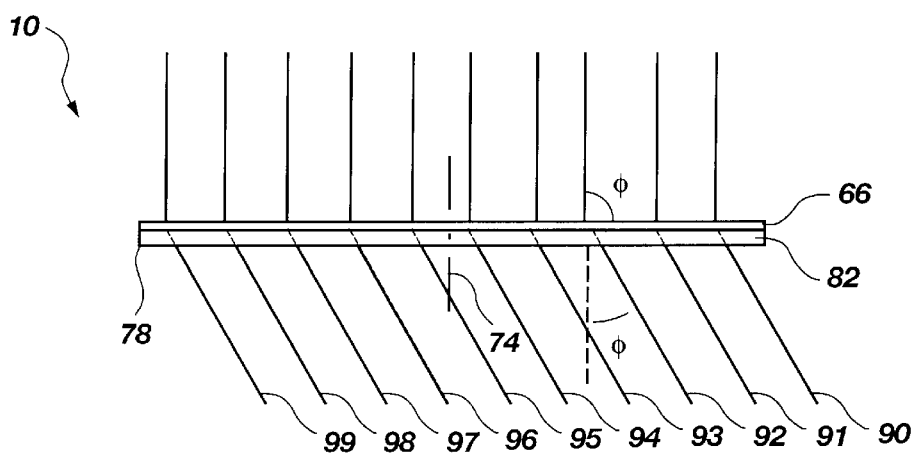
FIG. 3 is the beam director of FIG. 2, showing direction of parallel beams of backscattered light.

Consider FIG. 2, wherein is shown the HCE 66 and ray 92 of backscattered light at the scanning angle φ, as the ray 92 passes through the HOE 66 it is bent so as to exit from the HOE 66 at a desired angle θ, which in the preferred embodiment of the invention is 90° to the planar surface of the HOE 66. As seen in FIG. 3, all backscattered light rays 90, 91, 93, 94, 95, 96, 97, 98, 99 parallel with the ray 92, at the scanning angle φ, are similarly bent so as to exit at the desired angle θ, thereby remaining parallel. It is therefore possible to rotatably mount the beam director 10 substantially in common with the receiver 14 such that only backscattered rays of light 90–99 which arrive at the scanning angle φ and exit the HOE 66 at the angle θ will reach the receiver 14 and be detected, as indicated in FIG. 1.

Figure 4:
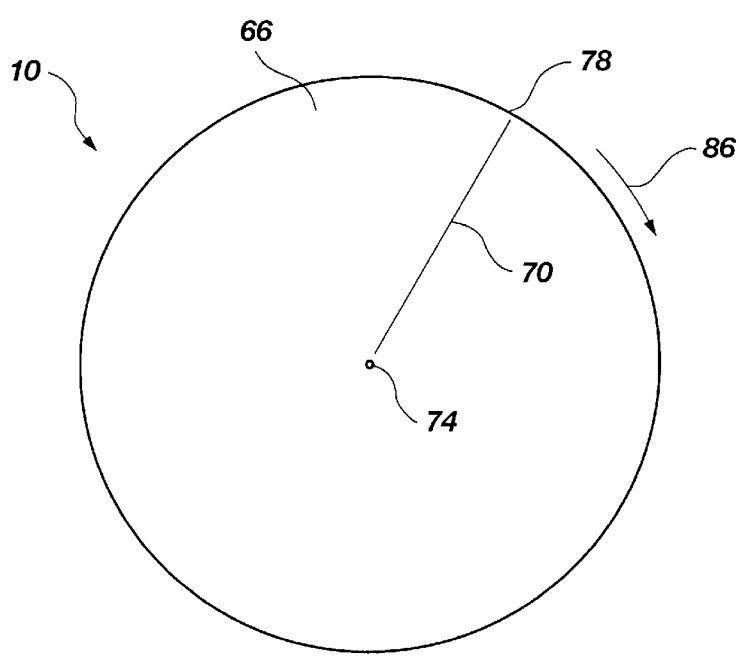
FIG. 4 is a top-down view of the beam director of FIG. 1.

In the preferred embodiment, the HOE 66 rotates about its center axis 74, similar to the rotation of a phonograph on a turntable, as indicated by the rotation arrow 86, shown in FIG. 4 It should be noted that the direction of rotation of the HOE 66 is immaterial, whether it be clockwise or counterclockwise, provided it coincides with the sweep of the transmitted beam 28 as indicated by the sweep direction arrow 29 in FIG. 5. Referring now to FIGS. 1 and 5, because the sweep of the transmitted beam 28 coincides with the rotation of the HOE 66, all backscattered light 62 along the scanning angle φ will be bent by the HOE 66 so as to reach the receiver 14; in turn with the sweep of the transmitted beam 28. Thus, as shown in FIG. 1, the transmitted beam will sweep the first object 18 at position 22 and the backscattered light 34 from the first object 18 will be bent through the beam director 10 and detected at the receiver 14 and then at a later time the transmitted beam will sweep the second object 24 at the second position 26 and the backscattered light 36 from the second object 24 will be bent through the beam director 10 and detected at the receiver 14.

Figure 6:
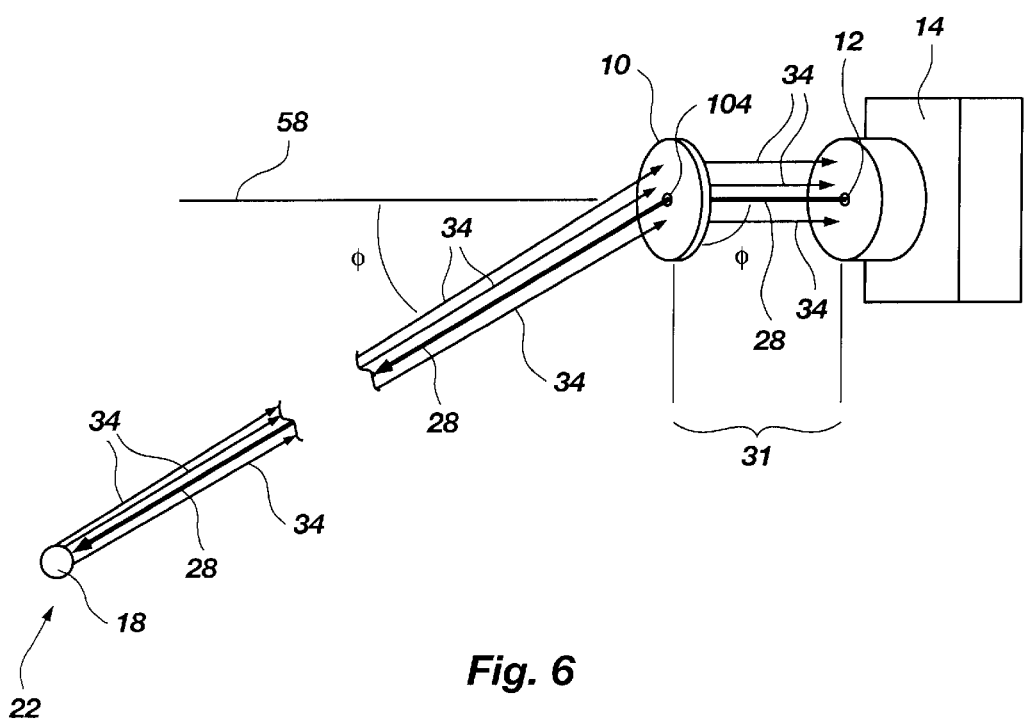
FIG. 6 is a schematic diagram of an alternative embodiment of the application of the beam director, made in accordance with the present invention, showing the beam director directing transmitted light from the lidar and gathering and directing backscattered electromagnetic radiation into a lidar receiver.

An alternative embodiment of the present invention is shown in FIG. 6. It will be noted that FIG. 6 is substantially like FIG. 1, however the lidar transmitter 12 and transmitted beam 28 are shown, wherein the transmitted beam 28 is passing through the beam director 10. In this alternative embodiment the beam director 10 directs the backscattered light 34 into the receiver 14 as discussed above. The difference is that in this case the beam director 10 directs the transmitted beam 28 as well as the backscattered light 34.

Figure 7:
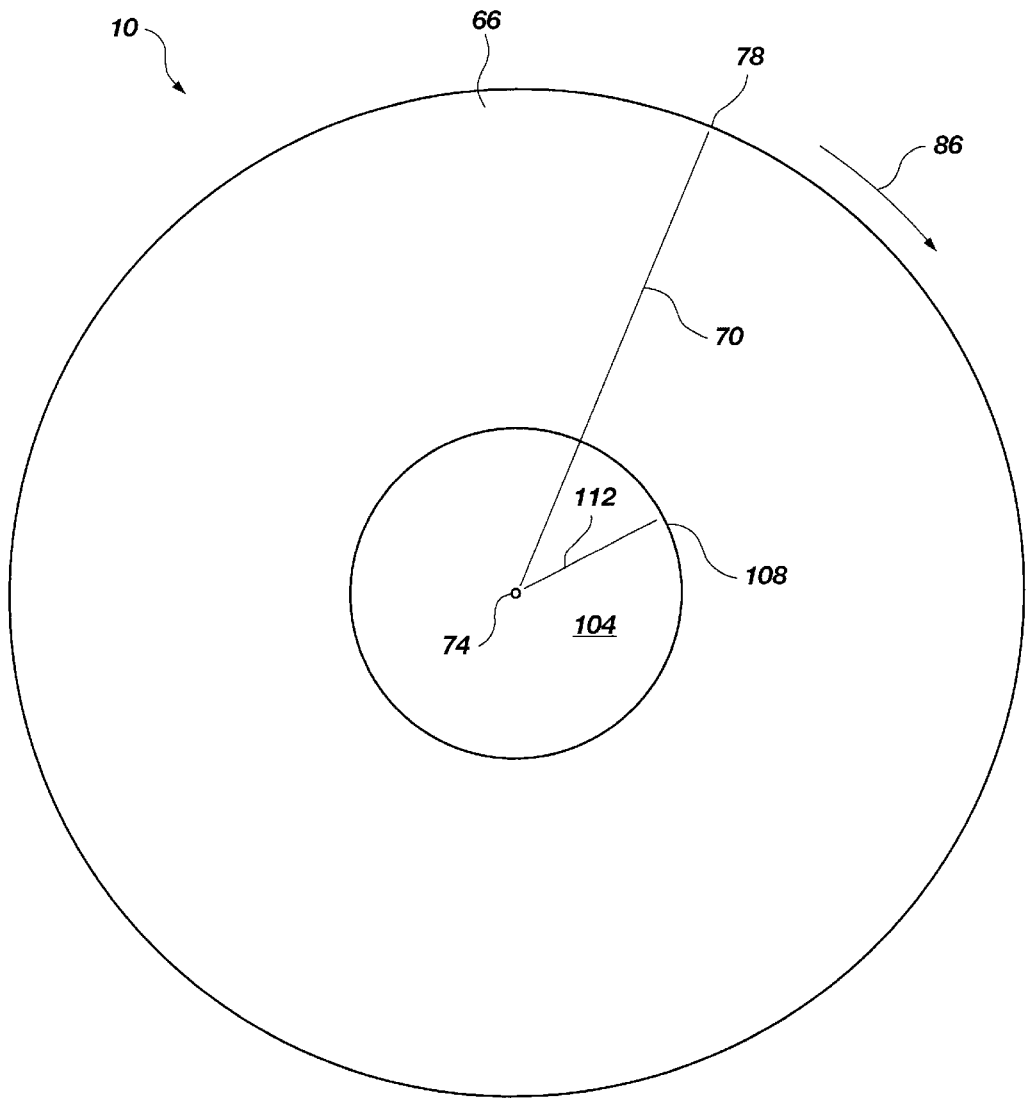
FIG. 7 is an alternative embodiment of the beam director of FIG. 6, showing the beam director having a prism.

The direction of the transmitted beam 28 from the beam director 10 at the scanning angle φ is accomplished by one of two alternatives. In this first alternative the transmitted beam 34 arrives at the beam director 10 at an angle θ and passes through the beam director 10, wherein the director 10 bends the transmitted beam 28 to the scanning angle φ. This process, which is a material property of a HOE, is just the opposite of what happens to the backscattered light 34, as shown in FIGS. 2–3. Referring to the second. alternative, a prism 104 is disposed in the beam director 10, also shown in FIG. 7. In the preferred embodiment of the second alternative, the prism 104 is disposed about the center axis 74 of the HOE 66, and the outer prism edge 108 has a radius 112 from the center axis 74 which is less than the HOE radius 70. In this second alternative the transmitted beam 34 arrives at the beam director 10 at the angle θ and passes through the prism 104 in the beam director 10, wherein the prism 104 bends the transmitted beam 28 to the scanning angle φ.

The present invention represents a significant advancement over the prior apparatus, methods and art of gathering backscattered light. It is particularly advantageous over the prior art due to use of at least one HOE to direct backscattered light into the receiver. The HOE is capable of gathering light from numerous different directions at a desired scanning angle by rotation about its axis; and furthermore, the present invention requires minimal mechanical elements, is small, and easy to use. The HOE of the preferred embodiment is only several tenths of an inch thick and very light as compared to a mirror. The transparent plate is only sufficiently thick so as to adequately support the HOE, thus the entire beam director is of a smaller size and mass as compared to the mirrors. A further advantage is that there presently are available holograms which may be used for the HOE having substantially high optical clarity and resolution quality. Because the HOE and transparent plate are of a minimal mass, there is a minimal moment of inertia and angular momentum associated with its operation; thus, it may be operated from a satellite using minimal momentum wheels or gyroscopic stabilizers resulting in minimal consumption of energy and fuel. These are advantages over the prior art, particularly for deployment of the invention in space for use in conjunction with lidar.

Although the prior art, apparatus and methods for gathering and directing backscattered light have been functional, they have utilized mirrors which have considerably more mass, greater size, and have involved manufacturing complexity than the practice of the present invention. The present invention will not include the assorted technical problems of milling or molding mirror surfaces to allowable tolerances, with the risk of cracking, shattering or the associated difficulties surface coatings. The problems in the prior art are overcome by the present invention, which does not require mirrors to direct either the transmitted light at an object or backscattered light to the receiver.

Those skilled in the art will appreciate from the preceding disclosure that the objectives stated above are advantageously achieved by the present invention.

While the present invention is described in terms of a backscattered light director or HOE, it is to be understood that the subject apparatus and method may be used in any field of light directing application. Those having ordinary skill in the field of this invention will appreciate the advantages of the invention, and its application to a wide variety of platform vehicle uses.

Figure 8:
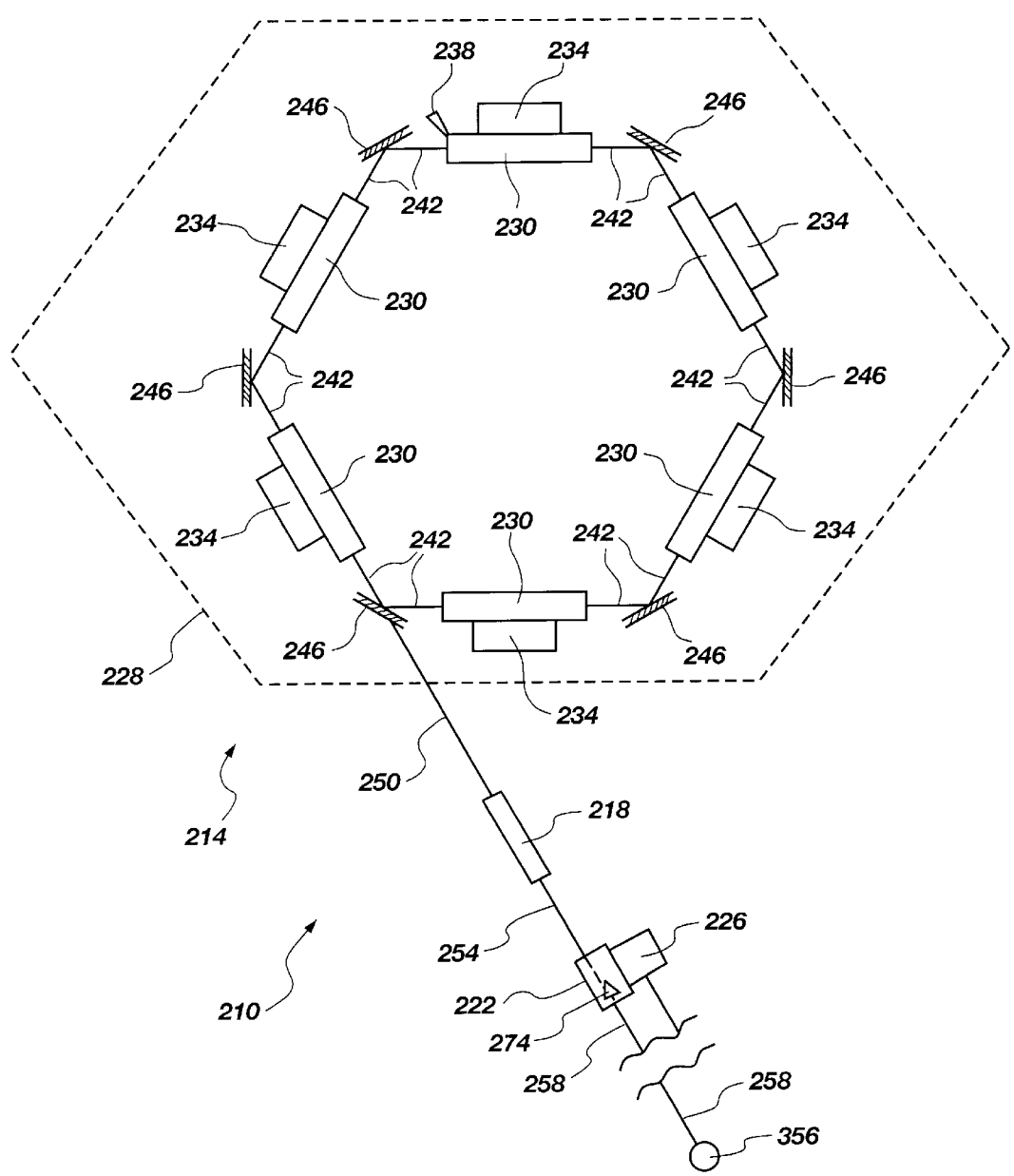
FIG. 8 is a schematic view of a lidar made in accordance with the principles of the present invention.

Referring now to FIG. 8, there is shown a lidar, generally designated at 210. The lidar comprises a transmitter generally designated at 214, a wave chamber 218, a beam scanner 222, and a backscatter light receiver 226.

In a preferred embodiment the transmitter 214 comprises at least one stabilized Alexandrite ring laser 228, which is schematically represented in a general way in FIG. 1. One familiar with the art will recognize the invention may be practiced using one or more lasers. The transmitter 214 comprises a number of Alexandrite rods 230, although any medium suitable for light amplification by stimulated emission of radiation may be used. Alexandrite, a naturally occurring gem stone which can be synthetically reproduced, is a desirable medium. In addition to its other advantageous properties, Alexandrite operates in the near-infrared region of the spectrum, having a wavelength between approximately 720–800 nanometers (nm). In the preferred embodiment the Alexandrite rods 230 are arranged in a ring or racetrack configuration. It should be understood that while the ring configuration is preferred, a linear arrangement may also be used. It should be further understood that any number of rods 230 may be used; for example, transmitter consisting of only a signal rod 230 in a linear configuration would be adequate.

The rods 230 are "pumped" using pumping laser diodes, schematically represented at 234. For laser action, or "lasing", to occur a metastable energy state must be achieved in rods 230. That is, energy must be introduced into the rods 230 which will excite the electrons of the atoms or ions in the laser material from the ground energy state into a higher state which rapidly decays to a metastable energy state; because the metastable energy state is of higher energy than the ground state, there exists a non-equilibrium state of electrons having a relatively long mean life against decay by the spontaneous release of energy. This is a description of the basic three-level scheme for laser operation, and as those skilled in the art are aware, this relatively long mean life can be on the order of nanoseconds. The process of exciting electrons into the higher energy state in order to reach the metastable state is called "pumping", and is most commonly accomplished by producing very short and intense bursts of light in the medium. When lasers were first developed, the excited metastable energy state was achieved using flash tubes which were placed adjacent to the laser medium and which produced very short and intense bursts of broad band (incoherent) light. While flash tubes could be used in the present invention, diodes are preferable because they are smaller, lighter, less frangible, easier to move, and moreover provide greater efficiency because narrower bands requiring lower energy input may be selected. Pumping of Alexandrite with 680 nm laser diodes has been demonstrated, with a slope efficiency of twenty-five percent (25%).

When the electrons spontaneously return from the metastable state to the ground state there is the release of energy in the form of photon emissions or light. In this metastable state, the introduction of a photon having the right energy can trigger an avalanche of stimulated emission events. In the present invention stimulated emission of radiation is triggered by an external source of photons, an injection diode 238, which introduces desired photons into at least one of the rods 230, causing an avalanche of like photons having the desired energy, direction, phase and state of polarization. The use of the injection diode 238 in inducing the avalanche of photons is a process known as "seeding." The result is a coherent (no phase shift over time) stream of photons emitted from the lasing medium 230, shown as the lasing beam 242.

Mirrors 246 direct the lasing beam 242 between the rods 230 to facilitate the lasing process of the ring configuration. The mirrors 246 are constructed of a reflective surface, not shown, so that the lasing beam 242 is reflected therefrom. One or more of the reflecting surfaces will allow a small amount of the lasing beam 242 to pass through substantially unreflected, which is the transmitted beam 250. In the preferred embodiment, the transmitted beam 250 of the Alexandrite ring laser 228 emerges in the near-infrared and is passed into a wave chamber 218 where it undergoes frequency doubling. While in the preferred embodiment the wave chamber provides for frequency-doubling, those skilled in the art will recognize that there are a number of ways to produce wave chambers having non-linear optical coefficients such that the transmitted beam 250 could undergo not only frequency-doubling, but frequency-tripling. In the preferred embodiment, the frequency-doubled beam 54 operates in the ultraviolet range. The frequency-doubled beam 254 enters the scanner 222 which sweeps the beam as desired, here denoted as the scanning beam 258.

The scanner 222 is referred to herein as a "laser source," even though the beam 258 originates from the seeding diode 238. The scanning beam 258 is thus projected by the scanner 222 laser source, and some appropriate portion of the scanner 222 is rotated appropriately, preferably in a conical sweep about a conical path with respect to the satellite 270 to thereby cause a conical sweep of the scanning beam 258. In some applications, a particular scanner may be simply rotated in plane, and thus not about a conical path, while still causing a conical sweep of the scanning beam, this being effectuated by optical properties of the particular scanner, as suggested below in reference to Holographic Optical Elements.

Scanners are generally constructed of rotating mirror having one of a number of shapes which include flat, concave or polygon structures, spinning on an axis. When the laser beam strikes the mirror the beam is reflected at an angle in accordance with the general rule that the angle of incidence equals the angle of reflection. There are also resonant and galvanometer scanners which twist a mirror back an forth over limited angular ranges in order to sweep the laser beam along a desired path. A scanner may sweep the beam back and forth or in a number of other patterns depending upon the number of mirrors and the manner in which they are moved to reflect the beam.

Figure 10:
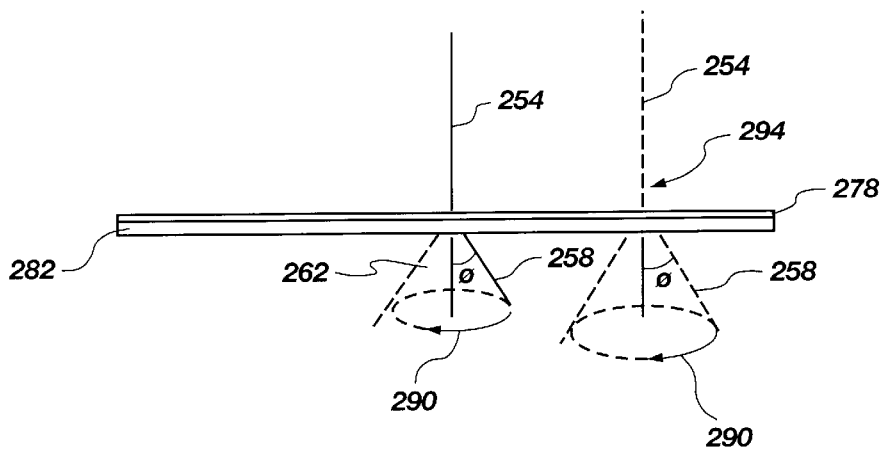
FIG. 10 is a side view of hologram used to generate sweep of the laser light of the lidar of FIG. 8.
Figure 11:
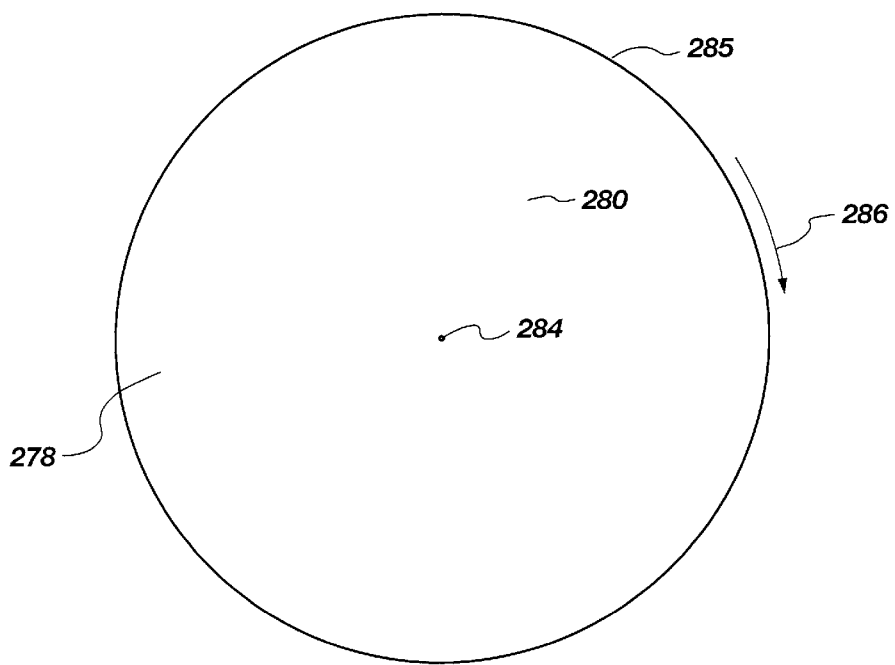
FIG. 11 is a top view of the hologram of FIG. 10.

In one embodiment of the present invention the sweep of the scanning beam 258 is caused by passing the frequency-doubled beam 254 through a spinning prism 274, shown in FIG. 8, which deflects the scanning beam 258 as desired. In the preferred embodiment of the present invention the frequency-doubled beam 254 passes through a rotating holographic optical element (HOE) 278, shown in FIGS. 10–11, rather than a prism 274 (substantially high powered beam 254 is not preferred). The HOE 278 is a thin sheet of material capable of receiving a holographic image. In the preferred embodiment, the HOE 274 is circular in shape, having a radius 280 defined from its center axis 284 to its edge 285, and further having a translucent plate 282 of sufficient size to support the HOE 278 while permitting unimpeded passage of scanning beam 258. The HOE 274 and the translucent plate 282 have minimal mass, and the HOE 274 may be only tenths of an inch thick. HOE are not known to be used by those skilled in the art of lidar.

The HOE 278 rotates about its center axis 284, similar to the rotation of a phonograph on a turntable, as indicated by the rotation arrow 286 (and it should be noted that the direction of rotation is immaterial, whether it be clockwise or counterclockwise). The rotation of the HOE 278 causes the sweep of the scanning beam 258 along a path which defines the conical region 262 described by the angle φ, such that the scanning beam 258 is caused by the optical properties of the HOE to be transmitted along a conical movement path; the movement of the scanning beam 258 thus described is indicated by the path arrow 290, shown in FIG. 10. As such, the concept of a conically sweeping laser beam 258 may be described in terms of a conically sweeping laser source which produces the conical sweep in the beam, or simply in terms of a conically sweeping beam regardless of what kind or type of laser source motion is used to accomplish the conical beam sweep.

It should be noted that the HOE 278 produces a substantially identical conical region regardless of where the frequency-doubled beam 254 strikes along the radius 280 of the HOE 278, as generally indicated by the ghost-lines 294. It should also be noted that the HOE 278 and the translucent plate 282 have a small moment of inertia and consequently a small angular momentum, requiring small amounts of energy for stable rotation.

Figure 9:
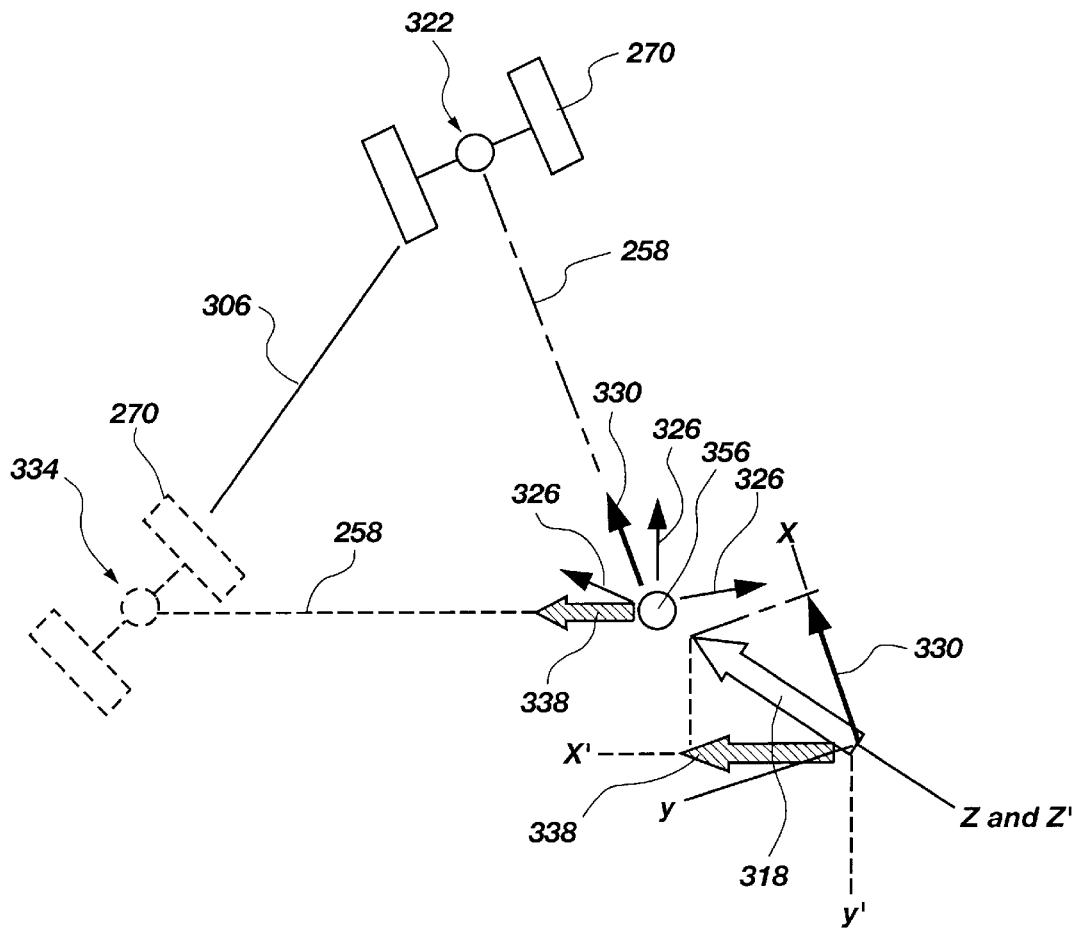
FIG. 9 is a diagram showing the use of the lidar of FIG. 8 in an airborne to determine velocity of objects.
Figure 12:
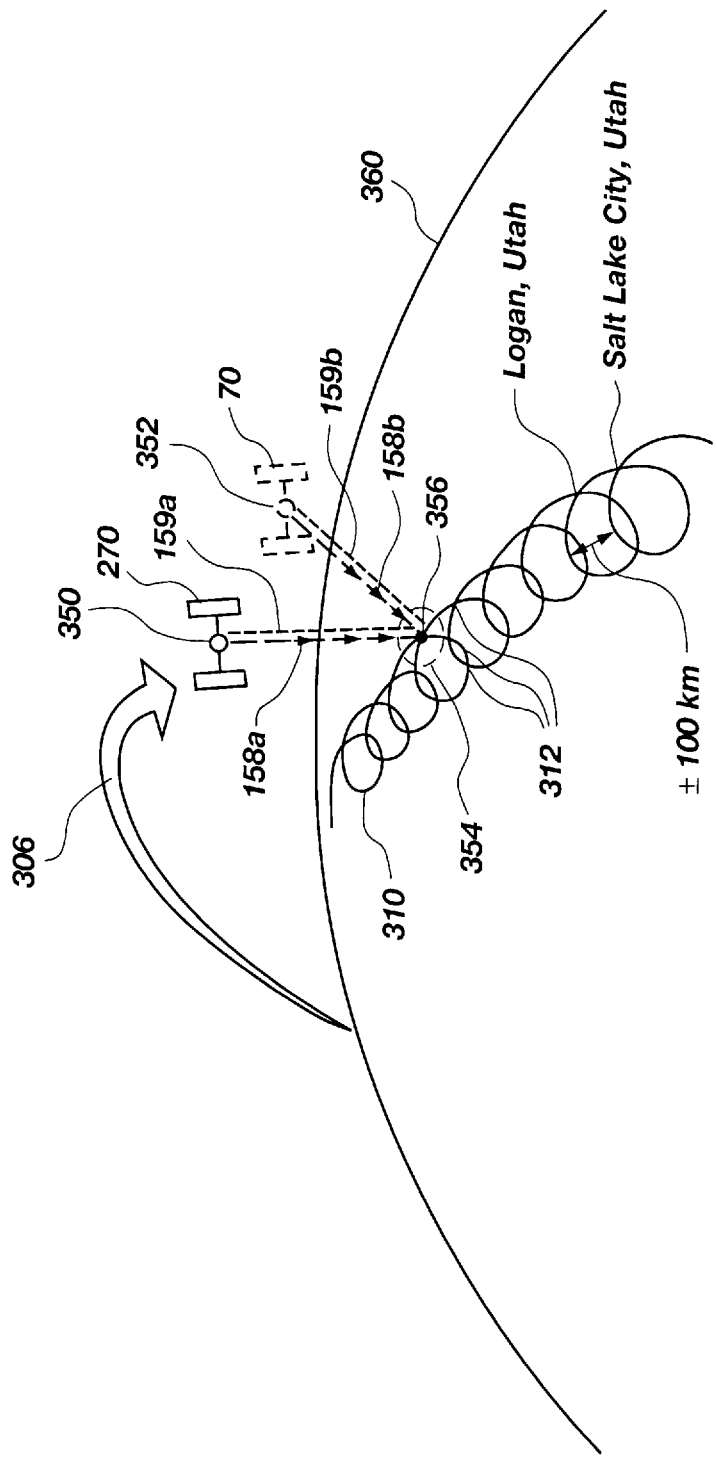
FIG. 12 is a diagram showing a partial sweep pattern of a satellite projecting laser pulses along a cycloid movement pattern.

Referring to FIG. 12, the conical sweep of the beam 158a and 158b, in combination with the orbital movement of the satellite 270 indicated by arrow 306, causes a transmission of laser beams about a cycloid pattern 310 having cross-over points 312. During the sweep through the cross-over points 312, the scanning beam 258 will strike an object 356 within area 354, which object may be either an air-born particle or a molecule, as shown in FIGS. 8, 9 and 12. While the scanning beam 258 may not strike the same object 356 in the cross-over point 312, with a sufficiently fast sweep it is proper to presume all particles of substantially identical size and mass will have a substantially identical particle velocity vector 318, as seen in FIG. 9 (where the particle velocity vector 318 represents that of the object 356).

FIG. 9 represents an object 356 at the cross-over point 312. FIG. 9 shows the satellite 270 in an initial measurement position generally indicated at 322 and a second measurement position generally indicated at 334. The difference between the position 3122 and 334 arises from the distance traveled by the satellite 270 from the time the scanning beam 258 initially passes over the crossover point 312 and the second time it passes over the crossover point 312. FIG. 9 further shows the object 356 and indicates the velocity and direction of the object with the vector 318. x- and y- and z-axes are shown, with the x-axis aligning with the scanning beam 258 from the satellite 270 in the first measurement position 322. The x-axis component of the vector 318 is indicated on the x-axis as the vector 330. x'- and y'- and z'-axes, are shown, with the x'-axis aligning with the scanning beam 258 from the satellite 270 in the second measurement position 334. The x'-axis component of the vector 318 is indicated on the x'-axis as the vector 338.

From an initial measurement position 322, the scanning beam 258 will strike the object 356, causing light to scatter in a number of directions, indicated by the scatter arrows 326. Some of the light will backscatter at a 180° angle to the scanning beam 258, along the x-axis. The first backscatter of light, not shown, travels back to the satellite (or other vehicle) and is received into the receiver 226, where a shift in the frequency of the first backscatter of light relative to the frequency of the light of scanning beam 258 is detected. This shift in frequency, known as a Doppler shift, indicates the speed of the object 356 relative to the line of sight of the scanning beam 258 and shown on the x-axis of the vector diagram in FIG. 9, and the x-axis speed of the object 356 is indicated by the magnitude of the vector 330.

The actual speed of the object 356 cannot usually be determined by this single measurement alone. Thus, a second measurement is taken a short time later, when the satellite has traveled along its orbital path 306 to a second measurement position generally indicated as 334. At the second measurement position 334 the scanning beam 258, indicated by the ghost-line from the second measurement position 334, will strike the object 356, and there will be a second backscatter of light at a 180° angle to the scanning beam 258. This second backscatter of light, not shown, travels back to the satellite and is received into the receiver 226, where again a Doppler shift is detected relative to the line of sight shown as the x'-axis of the vector diagram in FIG. 9, and the x'-axis speed of the object 356 is indicated by the magnitude of the vector 338. From the Doppler shifts in the first and second backscatters of light, and thereby knowing the magnitudes of the vectors 330 and 338, one skilled in the art can determine the speed of the object 356 at the crossover point 312. Furthermore, if one knows the first and second positions 322 and 334, and the respective angle of orientation for the scanning beam 258, one skilled in the art can determine the direction of movement of the object 356.

Where the object 356 is an air-borne particle the backscatter signal is an aerosol backscatter signal. Where the object 356 is a molecule, the backscatter signal is a Rayleigh backscatter signal. Rayleigh backscatter measurements may have advantageous intrinsic precision in the free troposphere 42 between 5 and 7 kilometers altitude, shown in FIG. 5, in daylight as well as in darkness, as the Rayleigh backscatter can exceed the aerosol backscatter signal by three orders of magnitude. Using a lidar operating in the ultraviolet, backscatter measurements may be made using aerosol, Rayleigh, or a synthesis of the two signals. Regardless of the nature of the signal measured, the object 356 is being carried by wind. Thus, a measurement of the speed of the object 356 is essentially a measurement of the speed of the wind at the altitude of the crossover point 312, and the direction of movement of the object 356 is a measurement of the wind direction.

It will be understood by those skilled in the art that although the specification discusses determining the speed and direction of an object 356 along the cycloid path 310 (FIG. 12) at a single crossover point 312 which has a given altitude, similarly there are additional crossover points at differing altitudes. Unlike ordinary optical systems, lidar provide an unlimited depth of sharp focus. Thus, the wind speed and direction can be accurately and precisely determined at differing altitudes. A 20 Watt transmitter 214, at an altitude of 350 kilometers, using a receiver 226 having a 1 meter diameter aperture telescope, may yield speed measurements having a precision of better than ±3 meters per second throughout the troposphere.

The movement of the satellite 270 along the trajectory of an orbital path 306 disadvantageously produces Doppler shifts in the backscattered light addition to the Doppler shift due to the movement of the object 356. An adjustment may be made either to the lidar transmitter 214 or receiver 226, to compensate for the Doppler shift due to the movement of the satellite 270, in order to provide for an accurate measurement of the speed direction of the object 356. A further tuning adjustment must be incorporated in the lidar of the present invention in order to compensate for the direction of the sweep of the scanning beam 258 as it pans through the cycloid path 310.

In the preferred embodiment of the present invention the desired adjustments to compensate for the Doppler shift due to the movement of the satellite 270 are made to the transmitter 214 through tuning the frequency of the lasing beam 242 (FIG. 8). Here, "tuning" is used to mean selectively varying the frequency of the lasing beam 242. While many lasing media may be tuned to some slight degree, in the present invention it has been found that the Alexandrite is an advantageous medium because it may be tuned over a broad number of frequencies, has a narrow frequency band width, and high spectral purity. The tunability of Alexandrite has been appreciated in the medical industry, and used in making tools for cutting, cleaning and drilling. Tunability of lasers has been considered and attempted for atmospheric purposes, although generally without substantial success.

Moreover, tunable lasers are not known to have been used to measure wind characteristics such as speed and direction. Thus, any lasing medium having the desired characteristics described above may be used. However, Alexandrite is the medium of the preferred embodiment; it being a medium selected from the group consisting of Alexandrite, Titanium Sapphire, Neodymium, NeodymiumYAG, Chromium-LiSaf, Ruby, Carbon-dioxide, Hydrogen-fluoride and the semiconductor families GaInP, GaAlAs and InGaAsP.

The Alexandrite is tuned using a temperature/current-tunable laser diode which enables it to be precisely and efficiently tuned electronically for use as the injection diode 238, shown in FIG. 8. The injection diode 238 is used to lock down the frequency of the lasing in the Alexandrite, as the injection diode 238 introduces photons into at least one of the rods 230, causing an avalanche of like photons in the Alexandrite having the desired energy, direction, phase and state of polarization. As pumping of the Alexandrite by the pumping diodes 234 continues, selectively varying the frequency of the photons introduced by the injection diode 238 in turn selectively varies the frequency of the lasing beam 242 and hence the frequency of the transmitted beam 250, frequency-doubled beam 254, and scanning beam 258.

Part of the uniqueness of the present invention lies in the concept that the injection diode 238 is used as a tuner. Instead of calculating the Doppler shift and correcting for the movement of the satellite 270 and the conical sweep of the scanning beam 258, the injection diode 238 is continuously tuned to varying frequencies based upon the known quantities of the movement speed of the satellite 270 and the conical movement and angle of the sweeping beam 258, to produce a frequency in the beam 258 which causes backscattered light to exhibit a Doppler shift which is equivalent to Doppler shifting which would have occurred in the absence of movement of the airborne vehicle and conical sweeping of the laser beams 258.

It is to be understood that the non-linear optical device 218 is preferred but optional. It may be eliminated if desired, since the raw, tunable light 250 originally emitted from the laser has several other applications, including determination of vapor content.

The present invention represents a significant advance over the prior apparatus, methods and art of atmospheric wind speed and direction measurement. It is noted that many of the advantages of the present invention are a result of the combination of a tunable lasing medium, particularly that of Alexandrite with lidar technology; and additionally, the use of lidar in a vehicle. Further advantage accrues due to using a holographic optical element in the scanner 222 to deflect the laser light of the scanning beam 258.

An advantage of one aspect of the present invention is the ability to measure wind speeds and directions at a variety of altitudes, at numerous locations over a large area; and the further advantage of the ability to measure wind speeds and directions at remote locations which are difficult to reach without the expenses associated with travel and information gathering in remote locations. The relatively fast sweep of the scanning beam 258 has the advantage of making it possible to make the desired measurements over short time periods providing information regarding the interrelationships of atmospheric conditions over a large area within narrow windows of time. Thus, the present invention provides at least a two dimensional substantially contemporaneous understanding of wind speeds and directions.

It is a significant improvement over the prior art that the lidar of the present invention has a transmitter 214 wherein the laser light source is adjusted to compensate for the speed and direction of movement of the laser as it travels above the earth. In the present invention adjustment is made to the light source so that the Doppler shift of interest is directly measured without adjusting the detection system. By contrast, in the prior art it has proven problematical to make the necessary adjustments to the detection system without compromising either precision or accuracy, or both.

Several other advantages of the present invention may not be readily apparent from the above specification. For example, one advantage arises because receivers detecting light in the ultraviolet region of the spectrum do not require substantial cooling to reduce thermally induced noise to detect desired signals. The lidar of the present invention operates in the ultraviolet, therefore substantially reducing, if not altogether eliminating, the need to cool the receiver to very low temperatures to avoid undesirable thermally induced noise. Another advantage to the use of ultraviolet laser light is that the frequency range is less likely to be harmful to the eyes, skin or tissues of life forms. The ultraviolet laser light is less harmful to the eyes because it is not in the visible range of the spectrum. Furthermore, ultraviolet light does not cause the heating associated with infrared or the burning associated with x-ray frequencies of the spectrum. One significant advantage of Alexandrite is that in addition to being tunable, it produces light having a narrow band width, high spectral purity, and excellent frequency stability because of the properties inherent to the crystal lattice structure of this medium, thereby making it possible to measure the speeds and directions of small objects, such as molecules and air-borne particles, at substantial distances. This is essentially due to the backscattered light having a clear signal, the narrow frequency producing a sharp signal, the high spectral purity assuring the detected frequency is the Doppler shifted frequency of interest, and the frequency stability avoiding frequency drifts which require repeated monitoring in order to correctly determine the Doppler shift.

Another advantage of an aspect of the present invention is that of continuous nadir-viewing adjustments or sweeps with a minimal moment of inertia and angular momentum which are possible using the prism 274 and more particularly the HOE 278. Furthermore the HOE is small and mechanically simple as compared with the mirrored systems of the prior art and uses components which would be easy to check for defects, would be to replace maintain, and would be comparatively inexpensive to make when compared with the mirrored systems.

Referring now to FIG. 12, it will be appreciated from the preceding disclosure that the simultaneous movements of the satellite 270 and the conical sweep of scanning beam 258 cooperate to project the multiple pulses of beam 258 along the cycloid path 310. The cross-over points 312 are shown at one elevation; of course, several elevated cycloid patterns with cross-over points will occur at various elevations on or above the earth 360. The cycloid pattern 310 is therefore a diagrammatic representation at a single elevation, but it is to be understood that the cycloid pattern of interest may occur at any elevation between the earth 360 and the satellite 270.

It is contemplated that the satellite 270 will travel at approximately eight kilometers per second, and that scanning beam 258*a* will comprise several beam pulses at a conical cycling speed to produce intersecting cycloid circles spaced at approximately 100 kilometers, such that outer cross-over points 312 would also be spaced approximately 100 kilometers apart.

For example, if the satellite 270 travels over the United States and passes over Utah, one cross-over point might occur at or near Logan, Utah, and a following cross-over point might occur at or near Salt Lake City, Utah.

In accordance with the disclosure above, a preferred method for detecting and measuring wind velocity comprises the steps of:

(a) projecting a first laser beam 258*a* from a moving airborne vehicle 270 onto a first predetermined area 354 when the airborne vehicle 270 resides at a first airborne position 350;

(b) projecting a second laser beam 258*b* from a moving airborne vehicle 270 onto the first predetermined area 354 when the airborne vehicle 270 has moved to a second airborne position 352, wherein steps (a) and (b) further collectively comprise conically sweeping a plurality of laser beams about a three-dimensional, substantially conical path with respect to the airborne vehicle 270;

(c) receiving first and second backscattered laser light 259*a* and 259*b* originating from the first and second laser beams, respectively, which light has been backscattered from at least one object 356 moving within the first predetermined area 354;

(d) calculating Doppler shifts in the first and second backscattered light 259*a* and 259*b* and producing Doppler shift data therefrom representing components of Doppler shifting caused only by movement effects of the at least one object 356, and thus without movement effects of the airborne vehicle 270 or of the conical sweeping of the laser beams 258*a* and 258*b*; and (e) calculating from the Doppler shift data and from known angles of orientation of the first and second laser beams 258*a* and 258*b*, a velocity of the at least one object 356 in the form of a movement speed and a movement direction of said object, and thus wind velocity of wind carrying the at least one object 356;

wherein steps (a) and (b) further collectively comprise projecting a plurality of laser beams onto a two-dimensional, substantially cycloid pattern 310 with respect to earth 360;

wherein steps (a), (b) and (d) further collectively comprise altering frequency of the laser beams sufficiently to adjust for movement effects of both the airborne vehicle and the conical sweeping of the laser beams to thereby cause Doppler shifting in the backscattered light to be equivalent to Doppler shifting which would have occurred in the absence of movement of the airborne vehicle 270 and conical sweeping of the laser beams 258*a* and 258*b*;

wherein steps (a), (b) and (d) further collectively comprise altering electrical current within an injection diode 238 to thereby alter the frequency of the laser beams 258*a* and 258*b*;

wherein step (a) further comprises projecting the first laser beam from the first airborne position onto the at least one object when said object is traveling along a movement path such that said first laser beam is disposed in a substantially nonorthogonal orientation relative to said movement path of said object;

wherein step (b) further comprises projecting the second laser beam from the second airborne position onto the traveling object such that said second laser beam is disposed in a substantially nonorthogonal orientation relative to the movement path of the object.

As those skilled in the relevant physics will appreciate, the velocity vector comprises both the scalar quantity of speed as well as direction. Thus, the method could be described more broadly as a method for detecting and measuring wind speed, or as a method for detecting and measuring wind direction. It will also be appreciated that a key aspect of the invention subsists in determining Doppler shifting in the backscattered light 259a and 259b and producing Doppler shift data therefrom representing components of Doppler shifting caused only by movement effects of the at least one object 356, and thus without movement effects of the airborne vehicle 270 or of the conical sweeping of the laser beams 258a and 258b; and calculating from the Doppler shift data and from known angles of orientation of the first and second laser beams 258a and 258b, a velocity of the at least one object 356 in the form of a movement speed and a movement direction of said object.

This production of Doppler shift data may be achievable in various ways, all of which are within the scope of the present invention. The preferred method is to continuously tune and adjust the frequency of the projected laser beams 258a and 258b, responsive to known kinematics of the speed of the satellite 270 and of the conical sweeping movement of the beams 258 (and their angles of orientation) such that the absolute frequency of the backscattered light 259a and 259b represents a Doppler shift equivalent to what the shift would have been had the satellite and beam 258 been stationary.

This is much more effective than simply projecting a series of beams of the same (i.e. unaltered) frequency, calculating the Doppler shift and then correcting the Doppler shift data to eliminate the effects upon that shift of the satellite movement and conical sweeping movement of the beam. Instead, the preferred method is to alter the frequency of the beams 258a and 258b to begin with, such that the resulting frequency and Doppler shift in the backscattered light 259a and 259b are equivalent to what they would have been had the initial frequency been unaltered and had the satellite been stationary and beams not sweeping.

Those skilled in the relevant field will appreciate that many, many particles reside within area 354 which are carried by wind current. Many of those particles will be contacted by a single laser pulse 258a or 258b and contribute to the backscattered light 259a and 259b. It is assumed that these particles are carred by wind in essentially the same state of motion, within an acceptable range of accuracy.

Any suitable light receiving means capable of receiving and processing optical energy may be used for the receiver 14. The preferred choice for a beam director means is the holographic optical element (HOE) 66 of FIG. 2, which is also described herein as a combination beam transmission/redirector means. The HOE 66 may be configured to have optical properties which diffractably alter a movement direction of light passing therethrough in either direction, from either side, as shown in FIG. 6.

It is to be understand that the concept of attaching the HOE 66 in a spaced-apart, fixed location with respect to the light receiving means 14 as used herein shall be construed to cover either stationary or rotational HOEs, and that the aspect of spaced-apart fixed location refers to the dimension 31 shown in FIG. 6 remains constant regardless of whether the HOE 66 is rotating. It is also to be understood that the phrase "nonstraight angle" as used herein shall be construed broadly to cover all angles other than 180 degrees.

Those skilled in the art will appreciate from the preceding disclosure that the objectives stated above are advantageously achieved by the present invention.

While the present invention is described in terms of lidar, it is to be understood that the subject apparatus and method may be used in any field of object speed and direction sensing application. Those having ordinary skill in the field of this invention will appreciate the advantages of the invention, and its application to a wide variety of lidar uses.

It is to be understood that the above-described arrangements are only illustrative of the application of the principles of the invention. Numerous modifications and alternative arrangements may be devised by those skilled in the art without departing from the spirit and scope of the present invention and the appended claims are intended to cover such modifications and arrangements.

What is claimed is:

1. A method of gathering backscattered light, said method comprising the steps of:

(a) attaching a light receiving means to a vehicle capable of air travel, for receiving and processing light;

(b) attaching a beam director means in a spaced-apart, fixed location with respect to the light receiving means, for receiving incoming light traveling along an incoming movement path and channeling and discharging said light into outgoing light traveling along an outgoing movement path such that said outgoing movement path is disposed in a nonstraight angle with respect to the incoming movement path, and positioning the beam director means such that said beam director means, light receiving means and outgoing light are disposed in alignment to thereby cause outgoing light discharged by the beam director means to be projected into the light receiving means; and (c) placing the vehicle into airborne flight and thereby moving the beam director means into a movement path of backscattered light to thereby intercept the backscattered light with said beam director means.

2. The method as defined in claim 1, further comprising the step of:

(d) rotating the beam director means.

3. The method as defined in claim 1, wherein step (b) further comprises selecting the beam director means such that it comprises a holographic optical element having optical properties capable of altering a movement direction of light passing therethrough.

4. The method as defined in claim 1, wherein step (b) further comprises selecting the beam director means such that it comprises a substantially planer holographic optical element having optical properties capable of altering a movement direction of light passing therethrough, and wherein step (c) further comprises moving the holographic optical element into a movement path of backscattered light such that said backscattered light enters said planer holographic optical element at a nonorthogonal orientation with respect to said planer holographic optical element.

5. A method of optical scanning comprising the steps of:

(a) attaching a laser light source to a vehicle capable of air travel;

(b) attaching a light receiving means to the vehicle for receiving and processing laser light;

(c) attaching a combination beam transmission/redirector means in a spaced-apart, fixed location with respect to the laser light source and light receiving means, for transmitting a laser beam outwardly from the vehicle in a first direction into contact with at least one airborne object and for receiving and redirecting light backscattered from said object as incoming light traveling along an incoming movement path and channeling and redirecting said backscattered light into redirected light traveling along a redirected movement path such that said redirected movement path is disposed in a non-straight angle with respect to the incoming movement path;

(d) positioning the combination beam transmission/redirector means such that said combination beam transmission/redirector means, light receiving means and outgoing light are disposed in alignment to thereby cause redirected light discharged by the combination beam transmission/redirector means to be projected into the light receiving means; and (e) placing the vehicle into airborne flight and actuating the laser light source to project a laser beam through the combination beam transmission/redirector means onto at least one airborne object such that light backscattered from said object passes through said combination beam transmission/redirector means.

6. The method as defined in claim 5, wherein step (b) further comprises selecting the combination beam transmission/redirector means such that it comprises a one-piece, unitary holographic optical element having optical properties capable of altering a movement direction of light passing therethrough.

7. The method as defined in claim 5, wherein steps (c) and (e) further comprise:

(f) selecting the combination beam transmission/redirector means such that it comprises a substantially planer holographic optical element having optical properties capable of altering a movement direction of light passing therethrough; and (g) actuating the laser light source to pump a plurality of laser beams therefrom, and rotating the holographic optical element to thereby conically sweep the laser beams about a three-dimensional, substantially conical path with respect to the airborne vehicle.

8. An optical scanning device comprising:

a source of optical energy for projecting optical energy beams;

a receiver disposed in a substantially fixed orientation with respect to the source, for receiving and processing optical energy;

a rotatable holographic optical element having optical properties capable of diffracting light passing therethrough at an angle, wherein the source, receiver and holographic optical element are disposed in substantial alignment such that both (i) initial optical energy projected from the source, and (ii) backscattered optical energy originating from the initial optical energy, are both caused to pass through the holographic optical element in opposing directions;

means for rotating the holographic optical element to thereby conically sweep the initial optical energy beams about a three-dimensional, substantially conical path with respect to the source.

9. The optical scanning device as defined in claim 8, wherein the holographic optical element comprises a light-diffracting prism disposed in a central location therein.

10. The optical scanning device as defined in claim 8, wherein the holographic optical element comprises a one-piece, unitary planer member.

11. The method as defined in claim 1, wherein steps (a) and (b) further collectively comprise projecting a plurality of laser beams onto a two-dimensional, substantially cycloid pattern with respect to earth.

12. The method as defined in claim 11, wherein steps (a) and (b) further collectively comprise conically sweeping a plurality of laser beams about a three-dimensional, substantially conical path with respect to the airborne vehicle.

* * * * *